US006474973B2

(12) United States Patent
Beckmann et al.

(10) Patent No.: US 6,474,973 B2
(45) Date of Patent: Nov. 5, 2002

(54) EXTRUDER DIE HEAD

(75) Inventors: Hans-Udo Beckmann, Luedenscheid; Juergen Linkies, Lienen; Dieter Aus Dem Moore, Hoerstel, all of (DE)

(73) Assignee: Windmoeller & Hoelscher, Lengerich (DE)

( * ) Notice: Subject to any disclaimer, the term of this patent is extended or adjusted under 35 U.S.C. 154(b) by 0 days.

(21) Appl. No.: 09/759,156

(22) Filed: Jan. 16, 2001

(65) Prior Publication Data

US 2001/0010828 A1 Aug. 2, 2001

(30) Foreign Application Priority Data

Jan. 14, 2000 (DE) .......................................... 100 01 362

(51) Int. Cl.[7] .............................................. B29C 47/20
(52) U.S. Cl. ........................ 425/190; 425/380; 425/467
(58) Field of Search ................................ 425/380, 190, 425/467

(56) References Cited

U.S. PATENT DOCUMENTS 4,201,532 A * 5/1980 Cole ........................ 425/326.1
4,298,325 A * 11/1981 Cole ........................ 425/133.1
4,299,553 A * 11/1981 Swaroop .................. 137/561 A
4,731,216 A * 3/1988 Topolski ................ 264/171.26
5,261,805 A * 11/1993 Gates ........................ 425/72.1

FOREIGN PATENT DOCUMENTS

WO    88/01226    2/1988

* cited by examiner

*Primary Examiner*—Nam Nguyen
*Assistant Examiner*—Brian L Mutschler
(74) *Attorney, Agent, or Firm*—Jacobson Holman PLLC

(57) ABSTRACT

An extruder die head, preferably a blown film head, has an internal cylindrical mandrel and a cylindrical jacket, which envelops concentrically the mandrel. Between the mandrel and jacket an annular channel is formed that empties into a die slit. At least one melt-supplying line empties into the annular channel in the area opposite the die slit. To avoid slits between the central mandrel and the jacket, enveloping the mandrel, where the polymer melt can accumulate and deposit, the mandrel is made as one piece with a flange-like foot and is provided in the area, adjacent to the foot, with at least one borehole, which feeds in the melt. On the mandrel adjacent to the foot is shrunk a ring, which seals the slit between both the mandrel and jacket. The cylindrical jacket is mounted above and connected sealingly to the shrunk-on ring to form the annular channel.

16 Claims, 1 Drawing Sheet

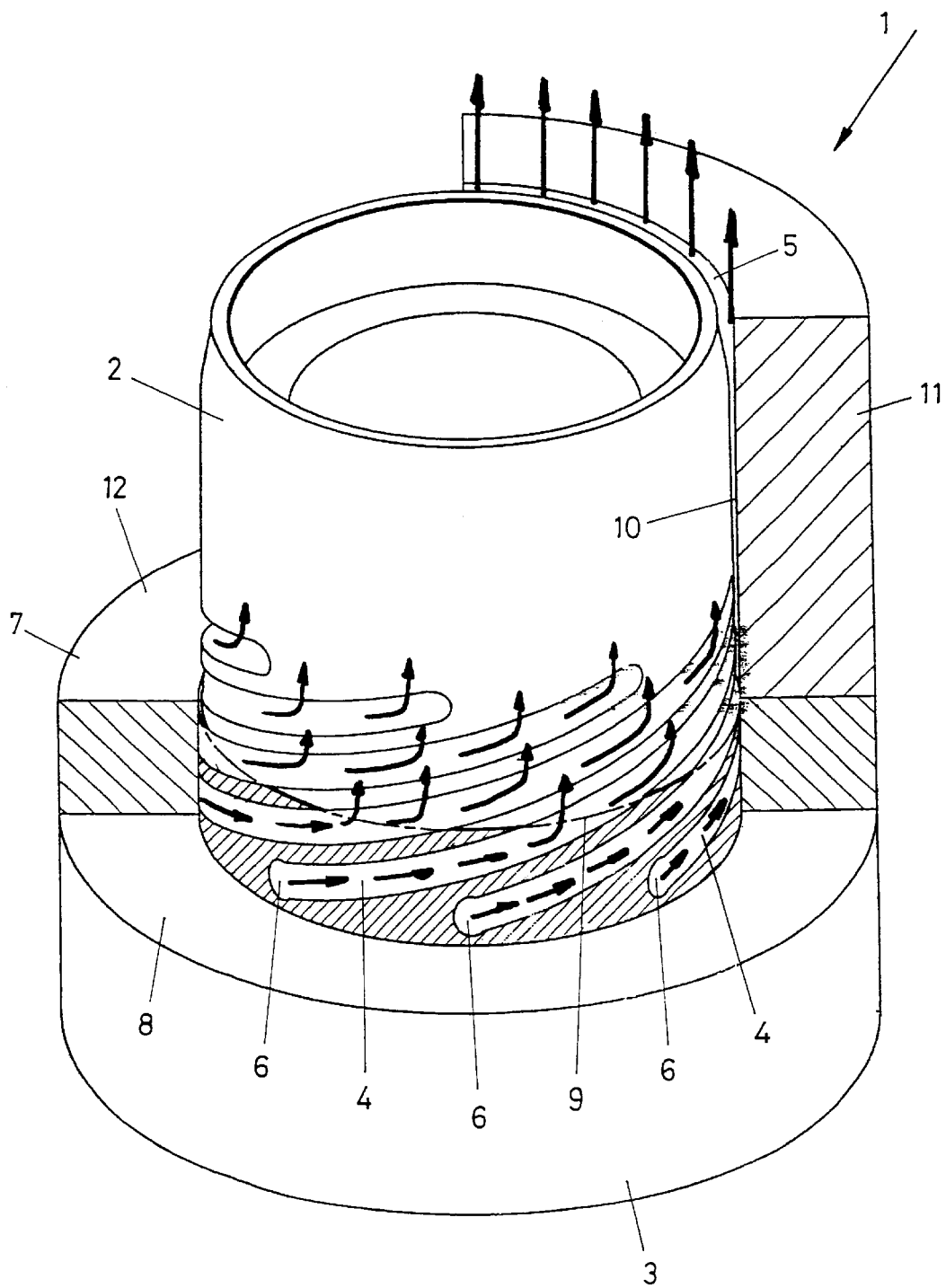

EXTRUDER DIE HEAD

BACKGROUND OF THE INVENTION

1. Field of the Invention

The invention relates to an extruder die head, preferably a blown film head, comprising an internal cylindrical mandrel and a jacket, which envelops concentrically the mandrel. Between the mandrel and jacket an annular channel is formed that empties into a die slit. The invention also comprises at least one line, which empties into the annular channel in the area opposite the die slit and which feeds a melt.

2. Related Art

Blown film heads of this type exist. Usually the mandrel exhibits one or several helical groove(s), whose depth decreases in the direction of the die slit, starting from the feed channel(s) so that the polymer melt overflows more and more the webs, which define the channels, and assumes a uniform flow in the axial direction. The prior art extruder die heads exhibit the special problem that the mandrel on the other side of the beginning of the annular channel is fitted sealingly into a cylindrical borehole of the jacket. If, however, the extruder die head becomes warm due to the polymer melt, flowing through said extruder die head, the jacket expands more, on account of its larger diameter, than the central mandrel so that between the two of them a slit can form, into which penetrates the polymer melt that is fed in under pressure. Since the melt can accumulate in the area of this slit and because of its long residence time in the hot die head, where it can decompose and become brittle, particles of the deposited melt can be dragged along by the melt. Said particles become obvious in the extruded film tube or the inflated film bubble as the defective spots.

SUMMARY OF THE INVENTION

Therefore, the object of the invention is to provide an extruder die head of the class described in the introductory part, wherein slits, in which the polymer melt can accumulate, deposit and become brittle, are avoided between the central mandrel and the jacket, enveloping the mandrel.

The invention solves this problem in that the mandrel is made as one piece with a flange-like foot and is provided in its area, adjacent to the foot, with at least one borehole, which feeds in the melt, and that on the mandrel adjacent to the foot is shrunk a ring, which seals the slit between both, and that on the ring is mounted a cylindrical jacket and is connected sealingly to said jacket, which envelops the mandrel, forming an annular channel.

In the case of the extruder die head of the invention, the mandrel is reliably sealed with respect to the flange-like foot, which can be connected to the mandrel as one material piece, by means of the ring that is shrunk on. The ring is shrunk on the mandrel with such a pretension that even if the mandrel and the ring become warm, no slit, into which the melt can penetrate and become brittle in said slit, can form between the two. The cylindrical jacket is mounted on the ring and connected sealingly to it.

A preferred embodiment provides that the mandrel exhibits in its area adjacent to the foot one or several helical groove(s), which exhibit(s) a depth that decreases in the direction of the die slit and which is (are) closed in the direction of the foot. The boreholes, which feed in the melt, empty in the initial regions of the grooves in the vicinity of the foot. In this respect the shrunk-on ring encloses sealingly the groove-free end of the mandrel and its initial region that is provided with the grooves. In this embodiment the shrunk-on ring seals without a gap the groove edges in the foot region of the mandrel so that from the grooves the melt, fed into the initial region of the grooves, can enter into the annular space between the mandrel and the jacket. In this space the melt can assume increasingly and uniformly an axial flow.

Preferably the foot and the ring are provided with radial annular surfaces, which lie in a common plane and which can lie sealingly on each other and can be mounted together so as to seal.

Preferably the ring and the jacket are also provided with annular surfaces, which lie in a common radial plane and which lie sealingly side by side and are mounted together.

To fasten the jacket to the ring, the jacket can be mounted by intercalating the ring through an expansion screw connection with the annular surface of the foot.

If the extruder die head is a blown film head, boreholes or channels can be provided in the known manner between the channels, feeding in the melt, in order to feed in and exhaust in the known manner the blowing air.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWING

One embodiment of the invention is explained in detail below with reference to the drawing. The single FIGURE is a schematic of an extruder die head with a cut ring, which is shrunk on the mandrel, and a cut jacket.

DESCRIPTION OF THE INVENTION

Although only one preferred embodiment of the invention is explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

The blown film head 1 comprises an internal mandrel 2, which is made as one piece with a flange-shaped foot 3. Starting from its region in the vicinity of the foot, the mandrel 2 is provided with multiple rows of helical grooves 4, whose depth decreases in the direction of the die slit 5. The initial regions of the grooves 4 are closed in the direction of the flange-like foot 3. Into the initial regions of the grooves 4 empty the boreholes 6, through which the melt is fed in over the non-illustrated boreholes and channels. On the mandrel 2 is shrunk sealingly a ring 7, whose cross section is rectangular and whose bottom annular surface rests flush on the radial annular surface 8 of the foot 3. The annular surface forms with the jacket of the mandrel 2 a right angle step. The shrunk on ring 7 envelops the initial region of the helical grooves 4 of the mandrel, and in particular in such a manner that it rests with considerable pretension sealingly on the shaded part of the mandrel 2, thus on the webs and edges, defining the grooves 4. The region of the mandrel 2, enveloped by the ring 7, is defined by the dashed line 9 in the direction of the die slit 5. Thus, at the upper edge of the ring 7, marked by the dashed line 9, the melt enters into the ring slit 10. On the ring 7 is mounted a cylindrical annular jacket 11. The annular channel or annular slit 10 is formed between the jacket and the mandrel 2, enveloped by the jacket. This annular slit 10 empties in the illustrated manner into the die slit 5.

The cylindrical jacket 11 is provided on its bottom end with a radial annular sealing surface, which rests flush and sealingly on the upper annular surface 12 of the ring 7 that is shrunk on. The cylindrical jacket 11 is provided with axial boreholes (not illustrated), which align with the boreholes of the ring 7. Into these boreholes are inserted tightening screws (not illustrated), which are screwed into the threaded boreholes (not illustrated) in the bottom flange-like foot 3.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An extruder die head, having an internal cylindrical mandrel and a cylindrical jacket, which envelops concentrically said mandrel, an annular channel formed between said mandrel and said jacket for emptying into a die slit, and at least one borehole, which feeds a melt into said annular channel in an area opposite said die slit, the improvement comprising:

said mandrel being made as one piece with a flange-like foot, and a ring shrunk onto said mandrel adjacent to said foot to seal the bottom of said annular chabbel between said mandrel and said jacket, said mandrel exhibits in an area adjacent to said foot at least one helical groove which exhibits a depth that decreases in a direction of said die slit and which closes in a direction of said foot and in an initial region in a vicinity of said foot empties said at least one borehole, and said shrunk-on ring encloses sealingly a groove-free end of said mandrel and said initial region that a provided with said grooves.

2. The extruder die head, as claimed in claim 1, wherein said foot and said ring are provided with radial annular surfaces, which lie in a common plane.

3. The extruder die head, as claimed in claim 1, wherein said ring and said jacket are provided with annular surfaces, which lie in a common radial plane.

4. The extruder die head, as claimed in claim 1, wherein said jacket is fixed in position with said ring.

5. The extruder die head, as claimed in claim 1, wherein said jacket is mounted by intercalating said ring with said annular surface of said foot.

6. An extruder die head, comprising:

a one piece internal cylindrical mandrel having a flange-shaped foot and at least one helical groove beginning in an initial region adjacent said flanged-shaped foot, said helical groove having a depth that decreases in a direction away from said flanged-shaped foot;

a cylindrical jacket concentrically enveloping said mandrel;

an annular channel formed between said mandrel and said jacket for emptying into a die slit;

at least one borehole, adjacent to said flange-shaped foot, for feeding a melt into said at least one helical groove in said initial region opposite said die slit; and a ring shrunk onto said mandrel adjacent to said flange-shaped foot for sealingly enclosing said initial region including a groove-free portion of said mandrel and said beginning of said at least one helical groove.

7. The extruder die head, as claimed in claim 6, wherein said foot and said ring are provided with radial annular surfaces, which lie in a common plane.

8. The extruder die head, as claimed in claim 6, wherein said ring and said jacket are provided with annular surfaces, which lie in a common radial plane.

9. The extruder die head, as claimed in claim 6, wherein said jacket is fixed in position with said ring.

10. The extruder die head, as claimed in claim 6, wherein said jacket is mounted by intercalating said ring with said annular surface of said foot.

11. The extruder die head, as claimed in claim 6, wherein said cylindrical jacket is mounted on and sealingly connected to said ring for forming said annular channel.

12. A blown film extrusion die head which comprises an internal cylindrical mandrel and a cylindrical jacket which concentrically envelops said mandrel and defines an annular channel between said mandrel and said jacket which empties into a die slit, said mandrel being made as one piece with a flange-shaped foot and provided with at least one borehole which feeds in melt into said annular channel, and a ring shrunk onto said mandrel adjacent to said foot which seals an initial region of said mandrel, said cylindrical jacket being mounted above and connected sealingly to said shrunk-on ring to form said annular channel, said mandrel having at least one helical groove, with a depth that decreases in a direction of said die slit and begins in said initial region for receiving said melt from said at least one borehole, and said shrunk-on ring enclosing sealingly said initial region including a groove-free portion of said mandrel and said beginning of said at least one helical groove.

13. The blown film head, as claimed in claim 12, wherein said shrunk-on ring seals said mandrel and said jacket for avoiding slits where the melt can accumulate and deposit.

14. The extruder die head, as claimed in claim 12, wherein said foot and said ring have radial annular surfaces.

15. The extruder die head, as claimed in claim 12, wherein said ring and said jacket have annular surfaces.

16. The extruder die head, as claimed in claim 12, wherein said jacket is fixed in position with said ring.

* * * * *